United States Patent

[11] 3,543,739

| [72] | Inventor | Andre Louis Mennesson<br>Neuilly-sur-Seine, France |
|---|---|---|
| [21] | Appl. No. | 766,264 |
| [22] | Filed | Oct. 9, 1968 |
| [45] | Patented | Dec. 1, 1970 |
| [73] | Assignee | Societe Industrielle De Brevets et D'Etudes<br>S.I.B.E.<br>Neuilly-sur-Seine,<br>a society of France |
| [32] | Priority | Oct. 11, 1967, Nov. 23, 1967, Jan. 16,<br>1968, April 10, 1968 |
| [33] | | France |
| [31] | | Nos. 124,114, 129,441, 136,261 and<br>147,703 |

[54] FUEL FEED DEVICE FOR AN INTERNAL COMBUSTION ENGINE
19 Claims, 21 Drawing Figs.

[52] U.S. Cl. ................................................ 123/119,
123/32
[51] Int. Cl. ........................................... F02m 51/00
[50] Field of Search ........................................... 123/119,
32(El), Inq

[56] References Cited

UNITED STATES PATENTS

| 2,787,649 | 4/1957 | Ballard et al. | 123/148 |
| 2,918,911 | 12/1959 | Guiot | 123/32 |
| 3,020,897 | 2/1962 | Sekine et al. | 123/32 |
| 3,032,025 | 5/1962 | Long et al. | 123/32X |
| 3,051,152 | 8/1962 | Paule et al. | 123/119 |
| 3,429,302 | 2/1969 | Scholl | 123/119 |
| 3,430,616 | 3/1969 | Glockler et al. | 123/119 |
| 3,460,520 | 8/1969 | Huber | 123/119 |

Primary Examiner—Wendell E. Burns
Attorney—Fleit, Gipple & Jacobson

ABSTRACT: The fuel is delivered, by a valve, into the inlet conduit downstream of the principal throttle member. A metering system opens the valve during a fraction of each revolution of a continuously rotating member. The metering system is controlled by an auxiliary throttle member disposed in the inlet conduit upstream of the principal throttle member and arranged to open automatically and progressively as the air flow rate in this conduit increases, such that said fraction varies in the same sense as the degree of opening of the auxiliary throttle member.

INVENTOR
ANDRE L. MENNESSON
BY Stevens, Davis, Miller & Mosher
ATTORNEYS

INVENTOR
ANDRE L. HENNESSON

ATTORNEYS

Patented Dec. 1, 1970

INVENTOR
ANDRE L. MENNESSON

ATTORNEYS

INVENTOR
ANDRE L. HENNESSON
BY
ATTORNEYS

INVENTOR
ANDRE L. MENNESSON

ATTORNEYS

ANDRÉ LOUIS MENNESSON
INVENTOR

BY Fleit, Gipple & Jacobson
ATTORNEYS

3,543,739

FUEL FEED DEVICE FOR AN INTERNAL COMBUSTION ENGINE

This invention relates to fuel feed devices, for internal combustion engines, of the type which comprise, on the one hand, an inlet conduit whose cross section is regulated by a principal throttle member adapted to be actuated by the operator, on the other hand, a source of fuel under pressure whose delivery circuit, which opens into the part of the inlet conduit situated downstream of the principal throttle member, is controlled by at least one valve actuated by an electro magnet, and furthermore, a metering system comprising a member driven in a movement of continuous rotation and adapted to send into this electromagnet an energization impulse during a fraction of each revolution of said member which fraction is regulated by this system.

It is known that the regulation of this fraction of a revolution determines, in a given interval of time, the overall duration of opening of the valve, and consequently, the flow rate of fuel injected into the inlet conduit.

An object of this invention is to provide a metering system which, although of simple construction, adapts the fuel flow rate to the air flow rate in this conduit, so that the richness of the air/fuel mixture is substantially constant, at least for certain conditions of operation of the engine.

For this purpose, the fuel feed device according to the invention is characterized by the fact that the metering system is controlled by an auxiliary throttle member which is disposed in the inlet conduit upstream of the principal throttle member and which is arranged to open automatically and progressively as the air flow rate in this conduit increases, in such a manner that said fraction varies in the same sense as the degree of opening of the auxiliary throttle member.

Such auxiliary throttle members have already been used for a long time to regulate locally the cross section of the passage for the fuel admitted into the inlet conduit, and consequently, its flow rate, but their application to fuel feed devices of the type mentioned above provides considerable advantages which are unexpected for the man in the art.

According to an advantageous solution, this member with continuous rotation movement comprises means adapted to emit, towards a stationary receiver, a flux of energy during a fraction of a revolution whose value varies as a function of the relative position of the rotary member and of the receiver, and this receiver is arranged so that it controls the energization circuit of the electromagnet according as it receives or not the flux of energy, the auxiliary throttle member modifying the relative position of the rotary member and of the receiver as a function of the air flow rate.

The rotary member can be constituted by a cylindrical hollow member rotating about its spindle and this member and the receiver can be arranged in a manner to be displaced one with respect to the other, axially this spindle, by the auxiliary throttle member. The rotary member can also be constituted by a plane disk perpendicular to its spindle of rotation and the stationary receiver can be arranged so that it can be moved towards or away from this spindle by the auxiliary throttle member.

In the case of a fuel feed device for an internal combustion engine having a plurality of cylinders which are each fed by a valve actuated by its individual electromagnet, it is advantageous to provide a distributor synchronized with this member to send successively the intermittent energization current into the various electromagnets, the assembly being such that the interruption of the circuit of one electromagnet and the establishment of the circuit of the following electromagnet takes place during the lapse of time when no energization current is produced.

The flux emitter means can be constituted by a luminous source cooperating with the rotary member arranged as an opaque screen provided with at least one window and the receiver can be constituted by at least one photoelectric cell capable, according as it is illuminated or not, of controlling the energization circuit of the electromagnet, the window of the screen having a shape such that the fraction of a revolution of the screen during which the illumination of the cell is permitted varies as a function of the relative position imposed on the screen and on the assembly of the source and of the cell by the auxiliary throttle member. The flux emitter means can also be constituted by magnetized plates, carried by a rotary member of nonmagnetic material, and the receiver by a magnetoresistance (that is to say by an element whose electrical resistance varies as a function of the magnetic flux to which it is exposed) inserted in the energization circuit of the electromagnet.

The invention will, in any case, be easily understandable from the following complementary description, as well as from the accompanying drawings, which complementary description and drawings are given merely by way of example.

The following description refers to fuel feed devices for engines for vehicles or the like.

Figure 1:
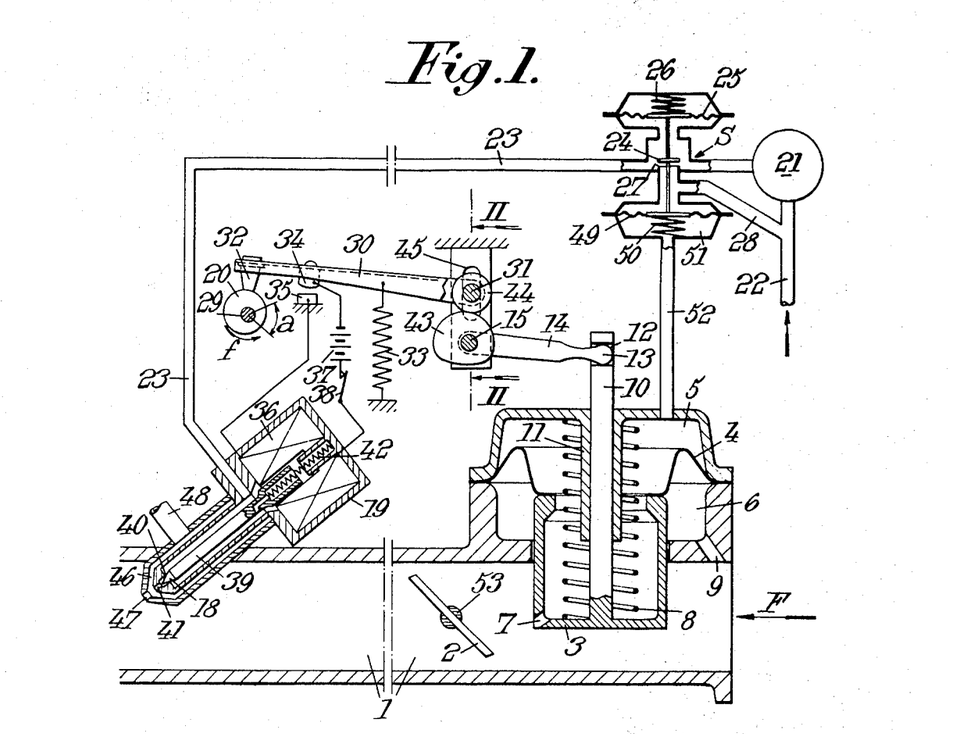
FIG. 1 shows, in schematic section, a fuel feed device according to a first embodiment of the invention.

This device comprises:

on the one hand, in its inlet conduit 1, upstream of a principal throttle member (or butterfly valve) 2 mounted on a spindle 53 and actuated by the operator, an auxiliary throttle member such as 3 (FIGS. 1, 4, 6 and 7), 3a (FIG. 3) or 3b (FIGS. 13 to 16) which opens automatically and progressively as the air flow rate in the conduit 1 increases;

on the other hand, means for injecting under pressure liquid fuel into the part of the conduit 1 situated downstream of the principal throttle member 2; and furthermore, a metering system responsive to the position of the auxiliary throttle member 3, 3a or 3b and adapted to regulate the flow rate of the injected fuel in such a manner that the richness of the air-fuel mixture flowing in the conduit 1 is substantially constant, at least for certain conditions of operation of the engine.

According to the embodiment of FIG. 1 (and of FIGS. 4 to 7), the auxiliary throttle member is constituted by a throttle member 3 adapted to be displaced transversely with respect to the conduit 1 in order to be able to obturate it more or less. This throttle member is actuated by a pneumatic device comprising a diaphragm 4 separating two chambers 5 and 6 from each other. An orifice 7, passing through the wall of the throttle member, puts the chamber 5 in communication with the section of the conduit 1 which is comprised between the throttle members 2 and 3. A spring 8 tends to push back the throttle member towards the interior of the conduit 1 towards a stop constituted generally by a boss 54 (FIGS. 4, 6 and 7) of this conduit, against the action of the suction transmitted into the chamber 5. The chamber 6 is put at atmospheric pressure by an orifice 9 which opens preferably in the intake of the conduit 1, between an air filter (not shown) and the throttle member 3. Finally, the throttle member 3 carries a central rod 10 which slides in a guide 11.

Figure 4:
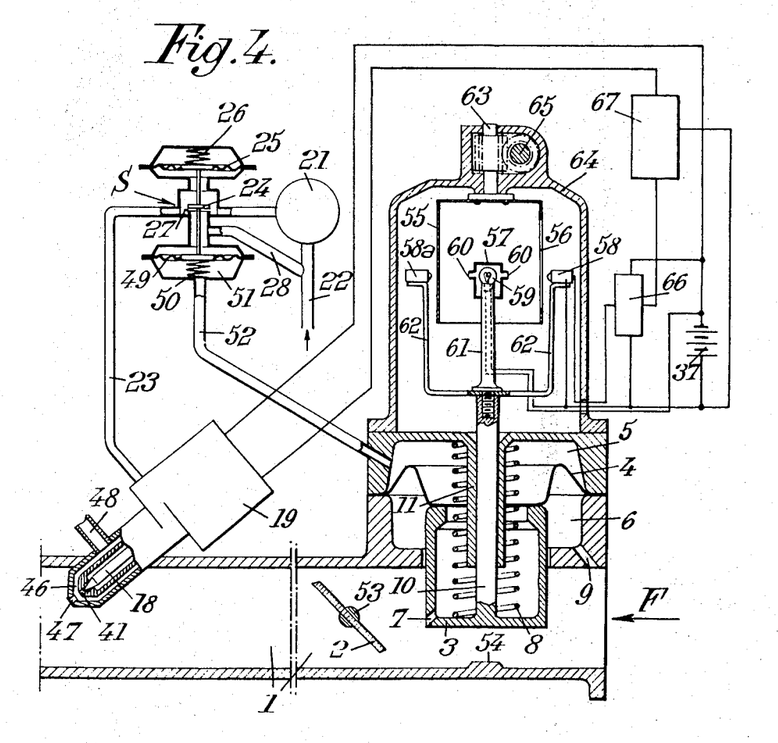
FIG. 4 shows, in schematic section, a fuel feed device established according to a second embodiment of the invention, in the position of normal operation.

It is known that the longitudinal position taken at each instant by the throttle member 3 corresponds to the flow rate of the air which flows in the conduit 1 in the direction of the arrow F (FIGS. 1 and 4). The larger this air flow rate is, the more the throttle member 3 rises; and a suction, substantially constant (or varying according to the characteristics of the spring 8), is established between the two throttle members 2 and 3.

Figure 3:
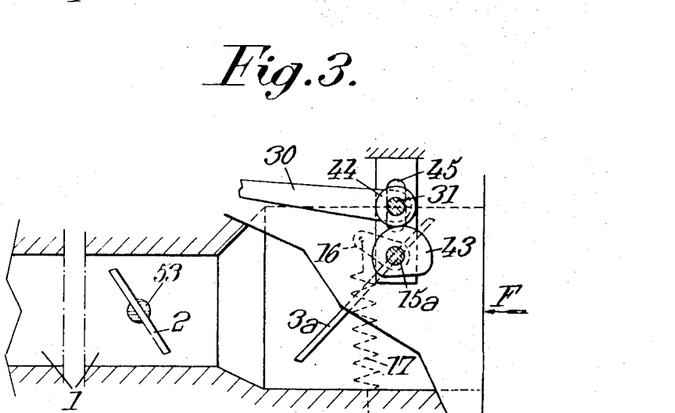
FIG. 3 shows a variant of certain elements of FIG. 1.

According to the embodiment of FIG. 3, the auxiliary throttle member is constituted by an eccentric butterfly valve 3a carried by a spindle 15a on which is fixed a lever 16, a return spring 17 being coupled to this lever. It is known (see in particular French Pats. Nos. 1,302,537 and 1,310,888) that the butterfly valve 3a fulfills the same functions as the throttle member 3, that is to say that its angular position or the angular position of the spindle 15a corresponds to the flow rate of the air which flows in the conduit 1 in the direction of the arrow F.

Figure 13:
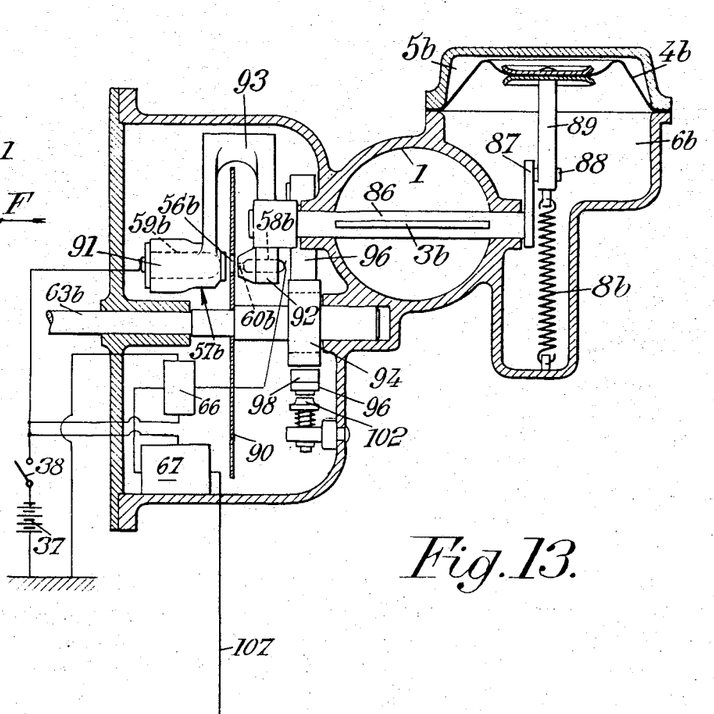
FIG. 13 shows, in schematic vertical section, a fuel feed device established according to a third embodiment of the invention.
Figure 14:
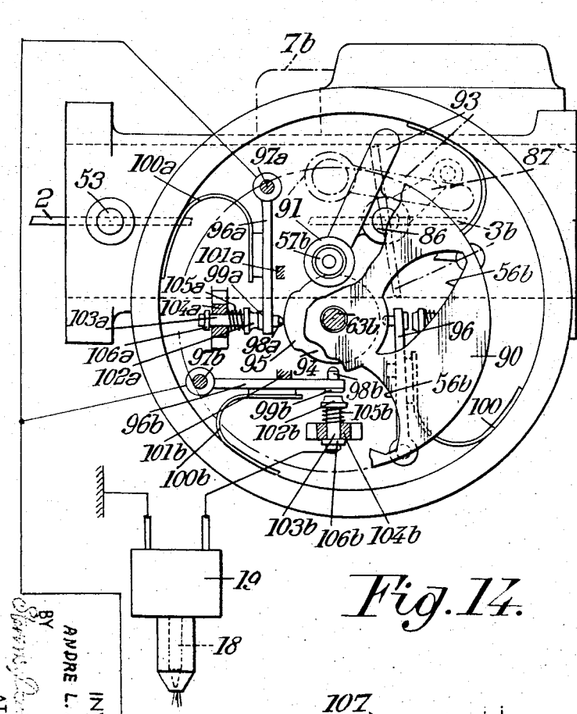
FIG. 14 shows the same device, seen from the left of FIG. 13, with its cover removed and a part of the screen disk cut away.

According to the embodiment of FIGS. 13 and 14, the auxiliary throttle member is constituted by a butterfly valve 3b, fixed on a spindle 86. This butterfly valve is actuated by a pneumatic device comprising a diaphragm 4b separating two chambers 5b and 6b from each other. A duct 7b puts the chamber 5b in communication with the section of the conduit 1 which is comprised between the throttle members 2 and 3b. The spindle 86 is rigid with a lever 87 provided, at its free end, with a pin 88 which cooperates with the end of a rod 89, which is connected to the diaphragm 4b. A spring 8b constantly tends to close the butterfly valve 3b against the action of the suction transmitted into the chamber 5b. The chamber 6b is put at near atmospheric pressure by a duct (not shown), analogous to the duct 9 of FIG. 1.

It is known that the angular position taken at each instant at the interior of the conduit 1 by the butterfly valve 3b corresponds to the flow rate of the air which flows in the conduit 1 in the direction of the arrow F (FIG. 14). The greater the air flow rate is, the more the butterfly valve 3b opens; and a suction, substantially constant (or varying according to the characteristics of the spring 8b), is established between the two throttle members 2 and 3b.

This being the case, according to the principal feature of this invention, the injection means are constituted by a source S of fuel under pressure (FIGS. 1 and 4) whose delivery circuit, opening in the conduit 1 downstream of the principal throttle member 2, is controlled by at least one valve 18 actuated by an electromagnet 19, the metering system comprises a member 20 (FIG. 1), 55 (FIGS. 4 to 11), 90 (FIGS. 13 and 14) or 108 (FIGS. 15 and 16) driven in a movement of continuous rotation (in the direction of the arrow F of FIG. 1) and capable, by acting on the energization of the electromagnet 19, of determining on only a fraction of each of its revolutions the opening of the valve 18, and this system is arranged so that it increases this fraction progressively as the opening of the auxiliary throttle member 3, 3a or 3b increases, and vice versa.

The source S is generally constituted by the assembly of a pump 21 (FIGS. 1 and 4), which draws the fuel from a reservoir (not shown) through a suction line 22, and of a pressure regulator disposed in the delivery line 23 of the pump. This regulator comprises a delivery valve member 24 coupled to a diaphragm 25 which is subjected to the action of a spring 26 tending to close it, the arrangement being such that the valve member 24 opens when the pressure in the line 23 exceeds a value determined by the area of the diaphragm 25 and by the value of the spring 26. The valve member 24 cooperates with a seat 27 which communicates through a return line 28 connected either to the reservoir, or (as shown) to the suction line 22.

Figure 2:
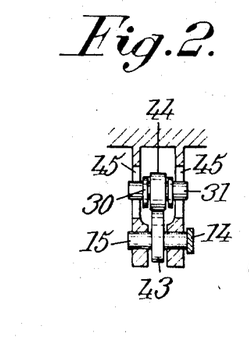
FIG. 2 is a section along II—II of FIG. 1.

According to the embodiments of FIGS. 1 to 3, the rotary member 20 is in the form of a cam fixed on a spindle 29 connected either to an electric motor of constant speed for example, or to the shaft of the internal combustion engine by a transmission imposing on it a speed of rotation which is preferably a multiple of the speed of rotation of that shaft. This cam cooperates with a lever 30 which is mounted, at one end, on a pivot pin 31 and which carries, at its other end, a follower 32 maintained in contact with the cam 20 by a spring 33. The lever 30 also carries a contact 34 which cooperates with a fixed contact 35, these two contacts being placed in series in the energization circuit of the coil 36 of the electromagnet 19. This circuit comprises a battery 37 (or another source of current) and a switch 38 which can advantageously be the ignition switch of the engine (the ignition circuit not being shown). The electromagnet 19 actuates a rod 39 whose end, forming the valve 18, cooperates with a seat 40 connected to the delivery line 23, the seat 40 ending with a calibrated orifice 41 which opens into the conduit 1. A spring 42 tends to close the valve 18 whereas, when it is energized, the electromagnet 19 opens this valve.

It will thus be appreciated that each revolution of the cam 20, fuel is injected into the conduit 1 during only the fraction of a revolution $a$ for which this cam permits the spring 33 to maintain the contact 34 in contact with the contact 35.

In order to vary this fraction of a revolution, there is preferably provided a kinematic connection between, on the one hand, the auxiliary throttle member 3 (FIG. 1) or 3a (FIG. 3) and, on the other hand, the ensemble of the lever 30 and the cam 20. According to the embodiment of FIG. 1, the central rod 10 has a part projecting out of the chamber 5, which part is provided with a slot 12, which receives the end 13 of a lever 14 mounted on a spindle 15. The kinematic connection can thus cooperate with the auxiliary throttle member 3 or 3a by the intermediary of the spindle 15 (FIG. 1) or 15a (FIG. 3). According to the embodiment represented in FIGS. 1 and 2, and to its variant of FIG. 3, this kinematic connection is arranged to displace the spindle 31 transversely with respect to the length of the lever 30. More precisely, the spindle 15 (or 15a) carries a cam 43 which cooperates with a roller 44 mounted on the spindle 31, which is guided by two slots 45, the assembly being such that the contact 34 moves towards the contact 35, for a given angular position of the cam 20, progressively as the opening of the auxiliary throttle member 3 or 3a increases. It should be noted that the spring 33 urges not only the follower 32 towards the cam 20 but also the roller 44 towards the cam 43.

It is advantageous to preserve the injection orifice 41 from the influence of the suction prevailing in the conduit 1 downstream of the principal throttle member 2. For this purpose, the orifice 41 is made to open into a chamber 46 communicating with the conduit 1 by an orifice 47 which is alined with the orifice 41 and whose cross section is preferably greater than the cross section of this latter orifice, and the chamber 46 is connected to atmosphere through a duct 48 whose cross section is considerably greater than the cross section of the orifice 47. The duct 48 can be connected to the intake of the conduit 1, downstream of the air filter mentioned above.

Finally, it is advantageous to arrange the regulator of the pressure of the source S so that it determines in the discharge line 23 a pressure proportional to the air pressure differential between upstream and downstream of the auxiliary throttle member 3 (3a or 3b). For this purpose, the valve member 24 of this regulator can be coupled not only to the diaphragm 25, but also to a second diaphragm 49 subjected to the action of a spring 50 and constituting the movable wall of a chamber 51 connected to the section of the conduit 1 comprised between the throttle members 2 and 3 (3a or 3b) by a duct 52, preferably via the chamber 5 and the orifice 7.

The operation of the feed device according to FIGS. 1 to 3 is as follows.

In the above, a has been used to designate the fraction of a revolution of the cam 20 during which the contacts 34 and 35 touch each other, and consequently, during which the valve 18 is open. If the number of revolutions of the cam 20 per second is called N, it is seen that the time during which the valve 18 is open, within a period of one second for example, is equal to:

$$N \times \frac{1}{N} \times \frac{a}{360} = \frac{a}{360}.$$

Consequently, during a duration of 1 second, the duration of opening of the valve 18 only depends on the fraction of a revolution $a$ of the cam 20 during which the contacts 34 and 35 touch each other. This duration is thus independent of the speed of rotation of the spindle 29 and of the cam 20.

Now, the angular position of the cam 43, and consequently the position of the pin 31 along the slots 45, depends at each instant on the flow rate of the air which flows in the conduit 1.

It is seen for example, in FIG. 1, that if the air flow rate decreases, for example following the closing of the throttle member 2, the throttle member 3 is going to be lowered and the cam 43 is thus going to rotate in the clockwise direction, which has the effect of raising the roller 44 and the articulation pin 31 of the lever 30.

The result is a greater separation of the contacts 34 and 35, so that, under the action of the cam 20, the fraction of a revolution $a$ is going to decrease since the follower 32 needs a longer linear stroke to bring the contact 34 against the contact 35.

Conversely, if the air flow rate increases, the pin 31 moves downwards in the slots 45 and the contacts 34 and 35 are going to move towards each other and tend to touch each other during a longer fraction of each revolution of the cam 20. It can even be envisaged, for high speeds of the engine, that these contacts close permanently the feed circuit of the electromagnet 19 so as to maintain the valve 18 constantly open.

Within any given period, the valve 18 delivers fuel during a duration, and consequently with a flow rate, which are proportional to the flow rate of air passing through the conduit 1. This presupposes that the pressure differential between the two sides of the throttle member 3 or that the suction between the two throttle members 2 and 3 (or 3a) is constant and has thus no influence on the diaphragm 49. In reality, when the principal throttle member 2 is opened or closed abruptly, the auxiliary throttle member 3 (or 3a) does not react instantaneously. Consequently, during a very shot time, the flow rate of the air which passes through the cross section left free in the conduit 1 by the auxiliary throttle member is no longer represented by the position of this member. In particular, in the case of FIG. 1, if the throttle member 2 is opened abruptly, the strong suction existing in the conduit 1 downstream of this member is going to be exerted very rapidly on the throttle member 3, and, until this throttle member has risen to reestablish the substantially constant pressure between the two throttle members 2 and 3, a slight excess of air is going to pass due to an increased pressure difference between the upstream and the downstream of the throttle member 3. An analogous phenomenon takes place in the case of FIG. 3.

Now, the increase of the suction between the two members 2 and 3 is transmitted through the orifice 7 in to the chamber 5 and through the line 52 into the chamber 51 defined by the diaphragm 49. An abrupt increase of the suction in the conduit 1 between the two throttle members 2 and 3 is thus translated by a tendency to close the valve member 24, which causes an increase of the pressure in the discharge line 23, and consequently, upstream of the valve 18. It is evidently the spring 50 which determines the value of such an increase of the pressure.

Consequently, during acceleration, the temporary decrease of the ratio between the flow rate of the fuel and the flow rate of the air admitted into the conduit 1, which decrease would be due to the delay taken by the throttle member 3 or the butterfly valve 3a to rise and to cause an increase of the fraction of a revolution $a$, is compensated by an increase of the pressure upstream of the valve 18. Conversely, when the throttle member 3 or 3a is closed abruptly, the reverse delay phenomenon takes place tending to increase temporarily the richness of the mixture due to the fact that the fraction $a$ remains too great, and this tendency towards increase of the richness is compensated by a temporary decrease of the pressure in the discharge line 23.

Due to the fact that the chamber 46 is maintained substantially at atmospheric pressure, the suction prevailing in the conduit 1 at the level of the orifice 47 has no action on the flow rate of the fuel coming out of the orifice 41. As the orifices 41 and 47 are coaxial, the jet of fuel coming out of the orifice 41 does not meet the walls of the orifice 47 before penetrating into the conduit 1.

In the case in which a plurality of cylinders are fed with the aid of the device which has just been described, as many valves 18 and electromagnets 19 can be used as there are cylinders. In this case, the breaker device including the contacts 34 and 35 can be constituted as an ignition device, with a cam having a plurality of bosses, and the distributor which sends the current into one or the other of the electromagnets such as 19 can be mounted on the same spindle.

Such a fuel feed device has numerous and real advantages among which the following can be mentioned. The advantage of a cam such as 20, driven by the engine at a speed which is preferably a multiple of the speed of the engine, is to permit the fuel injection to be cycled, that is to say to permit the determination of at what moment the injection of the fuel is made into the airstream, which permits improving the filling conditions of the engine.

According to a variant, not shown, the cam 20 can be displaced axially under the effect of displacements of the throttle member 3 or 3a, in a manner to present to the follower 32 cam surfaces corresponding to variable fractions $a$, the pin 31 then being fixed.

Beside certain advantages, the construction of FIGS. 1 to 3 has a few disadvantages. In particular, wear of the contacts 34, 35 can change rather considerably the fraction of a revolution of the rotary member or cam 20 during which the electromagnet 19 is energized. Moreover, the phenomena of inertia which take place at high speeds can cause a certain perturbation of the lever 30 and give rise to variations between the theoretical operation and the real operation. The effects due to the spring 33 which assures the movement of the lever 30 can cause a reaction on the auxiliary throttle member 3 or 3a. Finally, if, as is normal, the fuel feed device comprises a plurality of injectors, hence a plurality of lever and contact sets actuated by the same cam, there results a certain difficulty in synchronizing with considerable rigor the various contacts which must nevertheless have rigorously the same characteristics of operation.

This being recalled, according to the improvements whose purpose is to remedy the disadvantages mentioned above, the member having a movement of continuous rotation 55 (FIGS. 4 to 12), 90 (FIGS. 13 and 14) or 108 (FIGS. 15 and 16) comprises means adapted to emit, towards a stationary receiver, a flux of energy during a fraction of a revolution whose value varies as a function of the relative position of the rotary member and the receiver, this receiver is arranged so that it controls the circuit of energization of the electromagnet 19 according as it receives or not the flux of energy, and the auxiliary throttle member is made to modify the relative position of the rotary member and the receiver. The means for emitting the flux of energy can be a luminous source and the receiver a photoelectric cell.

According to the embodiment of FIGS. 4 to 12, the member 55 having a movement of continuous rotation is constituted by a screen provided with a window 56 and placed between a luminous source 57 and at least one photoelectric cell, such as 58 or 58a, and capable, according as it is illuminated or not, of controlling the circuit of energization of the electromagnet 19; and the auxiliary throttle member 3 is made to modify the relative position of the assembly formed by the source 57 and by the cell or cells 58, 58a, on the one hand, and the screen 55, on the other hand, along the axis of rotation of this screen; the window 56 of the screen 55 has a shape such that the fraction of a revolution of the screen during which the illumination of the cell 58 or 58a is permitted varies as a function of the relative position imposed by the auxiliary throttle member 3.

The luminous source 57 can be constituted by a lamp 59 which is adapted to be fed by the battery 37 as soon as the ignition contact of the engine is established, which lamp is disposed in a cover provided with holes 60. Each hole 60 is oriented in a manner to direct a pencil of light onto a cell 58 or 58a, the number of groups formed by a cell 58 and a hole 60 being equal to the number of cylinders of the engine that are going to be fed separately.

Preferably, the screen 55 is driven with a movement of simple rotation which leaves it an invariable axial position and the source 57 and the cells such as 58 are mounted on a common support which is driven with a movement of translation along the axis of rotation of the screen 55. For this purpose, the source 57 can be carried by a rod 61 extending the rod 10 of the throttle member 3 as far as the interior of the screen 55 which is in the form of a cylindrical shell, and the cells 58, 58a can be carried by supports 62 projecting from the rod 10 in such a manner that the cells are located outside this screen at the same height as the source 57. As for the screen 55, it can be carried by a spindle 63 alined with the rods 10 and 61 and supported by a casing 64 which surrounds the assembly of the rod 61 and the supports 62, this spindle 63 receiving its rotational motion from an exterior control, either directly, or for example by the intermediary of a spindle 65 and a helical pinion system. This control is itself advantageously driven by the internal combustion engine so that the speed of rotation of the screen 55 is proportional to the speed of the engine.

To exploit the currents generated in the cells 58, 58a, generally there is inserted between these cells and their respective electromagnets 19, on the one hand, a relay 66, and on the other hand, a current limiter 67. This current limiter has the effect first of allowing a very powerful pulse, hence a high current (1 ampere for example) to pass during a very short instant through the winding of the electromagnet 19 to raise the valve 18, then of reducing considerably this current to the value necessary for maintaining the valve open in order to limit the current consumption and the heating of the winding. Schematic wiring diagrams of the relay 66 and of the limiter 67 will be described in detail hereafter with reference to FIGS. 17 and 18.

The embodiment represented in FIGS. 4 to 7 operates in the following manner.

When the engine is running, the spindle 65 drives the spindle 63 at a speed in general proportional to the speed of the engine.

The screen 55, in rotating makes either its solid part or its window 56 pass across the path of the luminous rays which go from the source 57 to the cell 58, which permits the cell to be energized during a certain fraction of each revolution of the screen 55, and not to be energized during the rest of the revolution considered.

Figure 5:
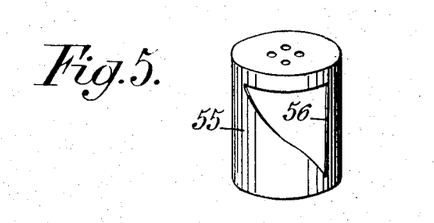
FIG. 5 shows, in perspective, an element of the device of FIG. 4.
Figure 6:
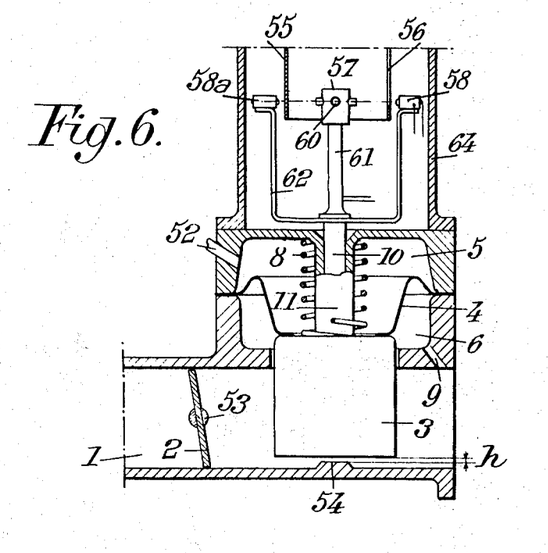
FIGS. 6 and 7 show various elements of the device of FIG. 4, in the positions that they occupy respectively during idling and when the engine is stopped.

The fraction of a revolution during which the cell is actuated depends on the height at which the luminous ray is located between the source 57 and the cell 58, with respect to the screen 55. Indeed, it is seen in FIG. 5 that due to the shape of the window 56, the higher this ray is located, the greater will be the fraction of a revolution during which the cell is energized. On the contrary, if the luminous ray is located towards the bottom of the screen, the fraction of a revolution during which the cell is reached by the luminous ray is very small and corresponds to the neighborhood of idling.

Now, the assembly of the source 57 and of the photoelectric cells 58, 58a is rigid with the throttle member 3 and moves up and down with this throttle member. It is thus seen that, in idling conditions during which the air flow rate is very small, this throttle member will occupy a very low position (FIG. 6), and consequently, the cells 58, 58a, like the source 57, will be towards the bottom of the screen 55, whereas on the contrary, for high flow rates of air, these same elements will be located at the upper part of the screen (FIG. 4).

Figure 7:
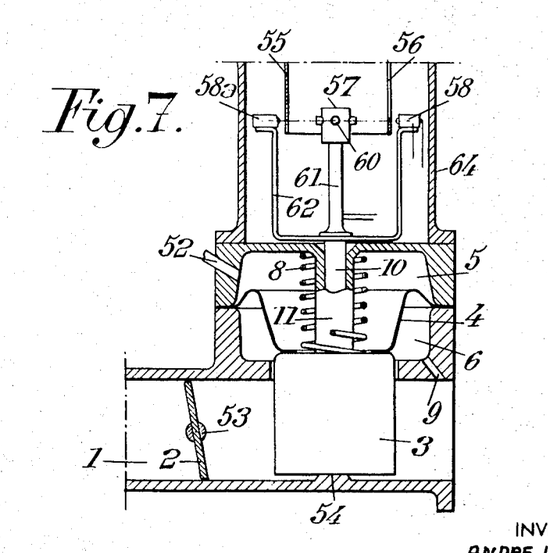

If the engine is stopped, the air flow rate becomes zero, and due to this fact, the throttle member 3 descends completely to the end of its stroke to come into contact with the boss 54 formed on the wall of the conduit 1, as shown in FIG. 7. At this moment, the height $h$, indicated in FIG. 6, which corresponded to idling, is nearly totally reduced and the luminous ray, which goes from the source 57 to the photoelectric cell 58, is constantly blocked off by the solid part of the screen 55 which is located below the window 56. In these conditions, regardless of the angular position of the screen 55, no photoelectric cell such as 58 can be energized, and consequently, the injectors cannot, in any case, deliver fuel.

It is only at the moment of starting, or of idling operation, that the depression raises again the throttle member 3, thus permitting the luminous ray to be raised above the continuous solid part of the screen 55, in order to be able to restore the device to its normal operation.

In this manner, a result is obtained that is rigorously identical to the result that was obtained by the mechanical means according to FIGS. 1 to 3, but with incontestable advantages with respect to the embodiment using mechanical means.

First of all, the speed of the engine has no influence on the operation of the device; no perturbation of the rotating elements need be feared, since these elements are reduced to a very light screen without a periodic alternating movement.

Moreover, the signals which trigger the action of the electromagnet have no inertia and their operation is perfectly precise, which furthermore permits the use of a plurality of photoelectric cells, such as 58, 58a distributed around the screen 55 and fed by the same luminous source 57, in order to feed as many electromagnets 19 as there are injectors. With such an arrangement, the fraction of a revolution during which the luminous ray will be blocked off will be rigorously the same for all the cells such as 58, 58a.

Finally, there will not be any reaction of the mechanism controlling the change of the useful fraction of a revolution of the screen, on the vertical movement of the throttle member 3, since there is no mechanical connection between the rotating screen and the various members actuated by the throttle member 3.

To the carburation device which has just been described with reference to FIGS. 4 to 7, it is easy to combine a system opposing atmospheric pollution during periods of deceleration of the engine. It is known that, in these periods, it is advantageous to decrease or even to eliminate the flow rate of fuel towards the engine. It is furthermore known that, during periods of deceleration, the principal throttle member 2 is closed, as during idling, but the speed of the engine is greater than a predetermined limit (1,200 r.p.m., for example) below which is located the idling speed.

Figure 8:
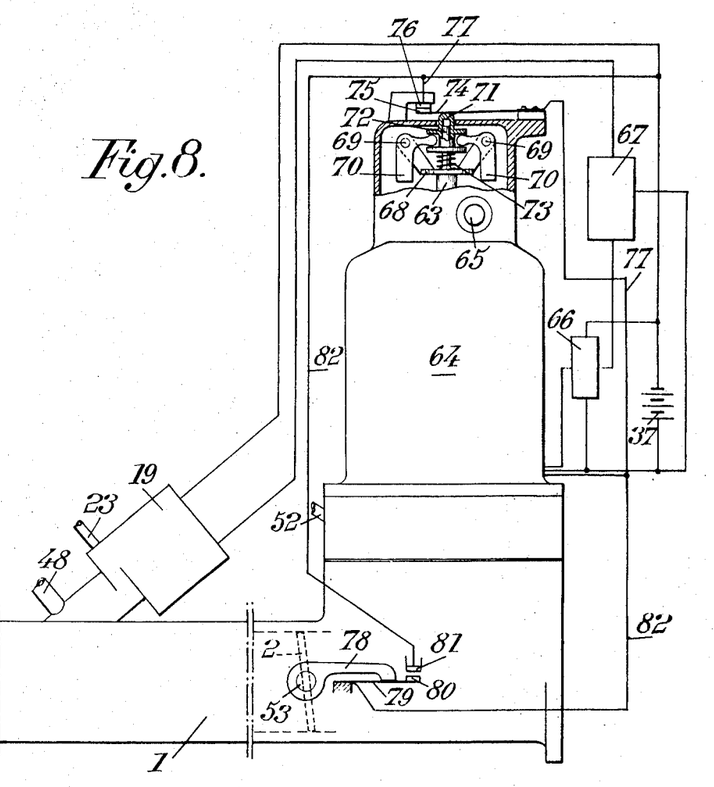
FIG. 8 shows, partly in elevation and partly in section, a fuel feed device established according to a variant of FIG. 4, in the idling position.
Figure 9:
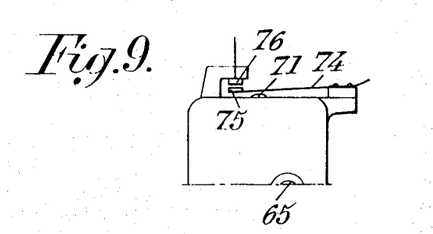
FIG. 9 shows a detail of FIG. 8, in the position of normal operation or of deceleration.

In order to constitute such an antipollution system, according to a first solution illustrated in FIGS. 8 and 9, the lamp 59 of the luminous source 57 is fed from the battery 37 in parallel by two contactors arranged so that one of them lets the current pass when the speed of the engine is lower than this limit and the other of them lets the current pass when the principal throttle member 2 is open beyond its idling position.

With regard to the first contactor, it can be controlled by a centrifugal regulator mounted on the spindle 63 of the screen 55, this spindle then being obligatorily driven by the internal combustion engine. For this purpose, as shown in FIGS. 8 and 9, the upper part of the spindle 63 is provided with a plate 68 supporting two arms 69 on which can pivot masses 70, which cooperate with the groove of a sliding piece 71 guided by a rod 72 extending the spindle 63. A spring 73 tends constantly to push the piece 71 upwardly whereas the centrifugal force exerted on the masses 70, during rotation of the plate 68, tends to make this piece move downwardly. The upper part of the piece 71 cooperates with a flexible blade 74 which carries a movable contact 75 cooperating with a fixed contact 76. The assembly of the contacts 75 and 76 constitutes the first contactor mentioned above which is inserted in a first conductor 77 feeding the lamp 59 and which permits this lamp to be lit when the speed of the engine, to which the speed of the plate is proportional, is lower than the above-mentioned limit. In this case, the contactor 75, 76 occupies the position of FIG. 8, whereas at higher speeds, it occupies the position of FIG. 9.

With regard to the second contactor, there is rigidly connected to the principal throttle member 2, by the intermediary of its spindle 53, a lever 78 adapted to cooperate with a flexible blade 79 which carries a contact 80, which itself cooperates with a fixed contact 81. The assembly of the contacts 80 and 81 constitutes the second contactor which is inserted in a second conductor 82 connected in parallel with the conductor 77, between the battery 37 and the lamp 59. The lever 78 is arranged to separate the contacts 80 and 81 during idling.

The operation of the antipollution system of FIGS. 8 and 9 is the following.

The injection of fuel can only take place when the luminous source 57 is operating, that is to say when the lamp 59 is fed either by the contactor 75, 76 (speed of the engine lower than the above-mentioned limit, idling of the engine, position shown in FIG. 8), or by the contactor 80, 81 (principal throttle member 2 open, normal operation). Consequently, when simultaneously the speed of the engine is higher than that limit, and the principal throttle member is closed, that is to say during periods of deceleration, the injection of fuel is stopped by extinction of the luminous source 57 which prevents the energization of the electromagnet 19.

In this manner, a sure, effective and practical system is obtained for preventing the emission of hydrocarbons and of carbon oxide during periods of deceleration.

Needless to say, as in the embodiment of FIGS. 4 to 7, the feed circuit of the lamp 59 is combined with the ignition circuit of the engine so that the current in the feed circuit is interrupted as soon as the ignition contact is itself cut.

Figure 10:
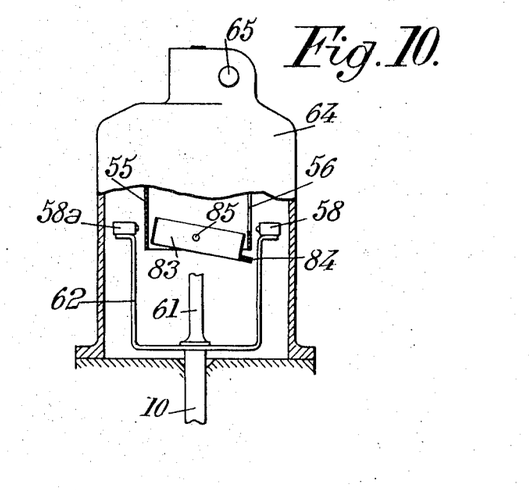
FIGS. 10 and 11 show, in section and in partial view, a fuel feed device established according to a second variant of FIG. 4, respectively in the idling position and in the position of deceleration.
Figure 11:
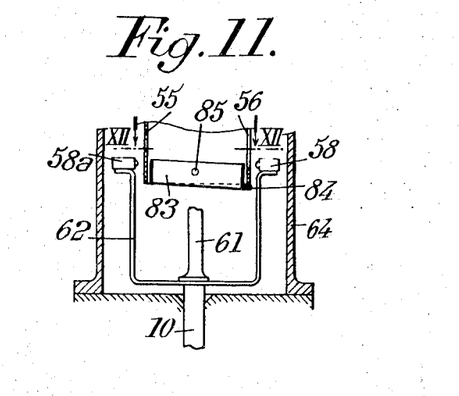
Figure 12:
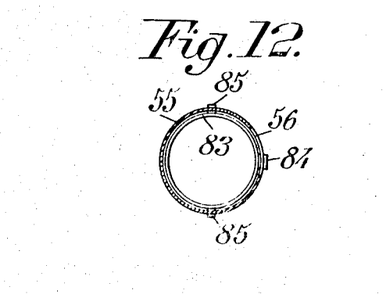
FIG. 12 is a section along XII—XII of FIG. 11.

In order to constitute the antipollution system according to the embodiment illustrated in FIGS. 10 to 12, which supposes that the screen 55 is driven by the internal combustion engine, this screen can carry an opaque ring 83 adapted to turn with respect to the screen 55 under the effect of the centrifugal force due to the rotation of the screen and situated so as only to be located in the neighborhood of the luminous beam coming from the source 57 towards the cell or cells 58,58a when the supports 62 of these cells are in the position common to idling and to deceleration but to block off this ray only when it (the ring 83) occupies, with respect to the screen, the position corresponding to speeds higher than the limit defined above.

For this purpose, the ring 83 is articulated, on two spindles 85, to the base of the cylindrical screen 55, and this ring 83 is arranged to have a natural tendency to pivot in the clockwise direction (according to FIGS. 10 and 11) about its spindles 85. This can be realized by a small supplementary mass such as 84 situated on a diameter of the ring perpendicular to the spindles 85, this supplementary mass being arranged in the form of an abutment, in order to limit the displacement in the opposite direction of the ring, and being placed so as to offset the center of gravity of the right-hand half ring lower than the spindles of rotation 85.

Progressively as the speed of the engine, hence the speed of rotation of the screen 55, increases, the ring 83 tends to take a different position by moving towards the substantially horizontal position indicated in FIG. 11. The position and the value of the mass 84 which permit the ring 83 to take, for values greater than this limit, the position of FIG. 11 are determined; in FIG. 11 the ring 83 blocks off the luminous rays, since it masks the lower part of the window 56, due to which the cell or cells 58, 58a cease to be illuminated.

Consequently, by adding this device to the fuel feed device of FIG. 4, there is obtained, in an extremely simple manner, the means of eliminating any injection of fuel during periods of deceleration, that is to say during periods in which the throttle members 2 and 3 occupy the idling position and during which the speed of rotation of the screen 55, which is driven by the engine, is higher than a predetermined limit.

According to the embodiments of FIGS. 4 to 12, a compact, simple and economical feed device is obtained, grouping in a single block all the controls necessary for good operation of the injectors. This device has a sure and precise operation, a not very high-cost price due to its simplicity and the possibilities of very easy installation since its controls are grouped in a single casing to be mounted on the inlet conduit 1.

According to the embodiment of FIGS. 4 to 7 and its variants of FIGS. 8 and 9 and of FIGS. 10 and 11, on the one hand, the means for emitting the flux of energy are constituted by a luminous source and the receiver by a photoelectric cell, and on the other hand, the member having a movement of continuous rotation is constituted by a screen 55 in the form of a cylinder or shell.

According to the embodiment of FIGS. 13 and 14, the member having a movement of continuous rotation, designated here by 90, is constituted, as previously, by a screen provided with at least one window 56b and placed between a luminous source 57b and a photoelectric cell (or receiver) 58b, capable, according as it is illuminated or not, of controlling the circuit of energization of the electromagnet 19; the relative position between, on the one hand, the assembly formed by the source 57b and by the cell 58b, and, on the other hand, the screen 90, with respect to the axis of rotation of this screen, is modified by the auxiliary throttle member such as 3b, the window 56b of the screen 90 having a shape such that the fraction of a revolution of the screen during which the illumination of the cell 58b is permitted varies as a function of this relative position.

The luminous source 57b is constituted, as in the case of FIGS. 4 to 7, by a lamp 59b which is adapted to be fed by the battery 37 as soon as the ignition contact 38 of the engine is established and which is disposed in a hollow boss 91 provided with a hole. This hole is oriented so as to direct a pencil of light onto the cell 58b, through a hole 60b passing through a hollow boss 92 in which this cell is housed. The feed circuit of the electromagnet 19 is the same as previously, and can, in particular, comprise a relay 66 and a current limiter 67.

This embodiment differs from the previous embodiments in that the rotary member or screen 90 is constituted by a plane disk, perpendicular to the spindle 63b which carries it, and the stationary receiver, such as the cell 58b, is arranged to be able to be moved towards or away from the axis of the spindle 63b.

According to the embodiment of FIGS. 13 and 14, the bosses 91 and 92 are carried by the ends of a forked support 93 which straddles the disk 90 so that the source 57b and the cell 58b are located on opposite sides of the disk; this support 93 is rigid with the spindle 86, which is itself parallel to the spindle 63b, as well as to the pencil of light received by the cell 58b.

The spindle 63b receives its movement of rotation from an exterior control which is itself advantageously driven by the internal combustion engine, so that the speed of rotation of the screen 90 is proportional to the speed of the engine.

According to a feature relating to an engine which has a plurality of cylinders each fed by a valve 18 actuated by an individual electromagnet 19 (a single group of elements 18, 19 has been shown in FIG. 14), and which (engine) can drive mechanically the spindle 63b, a distributor is provided, synchronized with the rotary member or disk 90 to send successively the intermittent energization current into the various electromagnets, the assembly being such that the interruption of the circuit of one electromagnet 19 and the establishment of the circuit of the following electromagnet takes place during the lapse of time when no energization current is produced, that is to say when the luminous beam coming from the lamp 59b is blocked off by a solid part of the screen disk 90 according to the embodiment of FIGS. 13 and 14.

This embodiment corresponds to a four-cylinder engine which has, consequently, four injectors such as 18, the spindle 63b being, for example, driven at an angular speed equal to half the speed of the engine. In this case, the distributor is advantageously constituted by a cam 94 fixed on the spindle 63b and provided with a lobe 95 which cooperates with as many contactors as injectors, only three contactors out of four having been shown in FIG. 14. Each contactor comprises a conductor arm 96 oscillating about a fixed conductor spindle 97 and provided with a follower 98 and with an electric contact 99. A spring 100 constantly urges the arm 96 in the sense which brings the follower 98 into contact with lobe 95, the displacement of the arm in this sense being limited by an abutment 101. Each movable contact 99 cooperates with a contact 102 carried by a rod 103 which slides in a fixed support 104. A spring 105 urges each rod 103 in the sense which moves its contact 102 towards the contact 99, the displacement of the rod 103 in this sense being limited by an abutment 106. To facilitate the description, two of the contactors shown in FIG. 14 have been distinguished by following the numeral references of their constituent elements by the letters $a$ and $b$ respectively.

When the boss 95 of the cam 94 is located opposite a follower 98 (the case of the follower 98a, in the position of FIG. 14), this follower moves radially away and the movable contact 99a comes to touch the contact 102a thus establishing an electric circuit between the corresponding spindle 97a and the rod 103a. Needless to say the other elements are electrically insulated, so that the electric circuit only closes by the intermediary of the contacts 99 and 102.

When the lobe 95 is not located opposite a follower 98 (the case of the follower 98b, in the position of FIG. 14), the corresponding arm 96b rests on its abutment 101b, the follower 98b no longer touches the cam 94 and the contacts 99b and 102b are separated from each other thus preventing any passage of current between the spindle 97b and the rod 103b.

In FIG. 14, one of the injectors 18 has been represented, whose electromagnet 19 has one terminal connected to ground, whereas the other terminal is connected to the rod 103b. The electromagnets of the other injectors (not shown) are connected in a similar manner, in particular to the conductive rod 103a. Moreover, the spindles such as 97a, 97b are connected in parallel by a conductor 107 to the relay 66 by the intermediary of the current limiter 67, which relay emits an energization current each time that the single cell 58b is illuminated.

The disk 90 has as many windows 56b as cylinders to be fed, these windows being regularly distributed about the spindle 63b; each window has a shape such that the fraction of a revolution during which it permits the cell 58b to be illuminated increases progressively as the throttle member or butterfly valve 3b opens, that it to say (according to the embodiment shown) progressively as the bosses 91, 92 move towards the axis of the spindle 63b.

Figure 19:
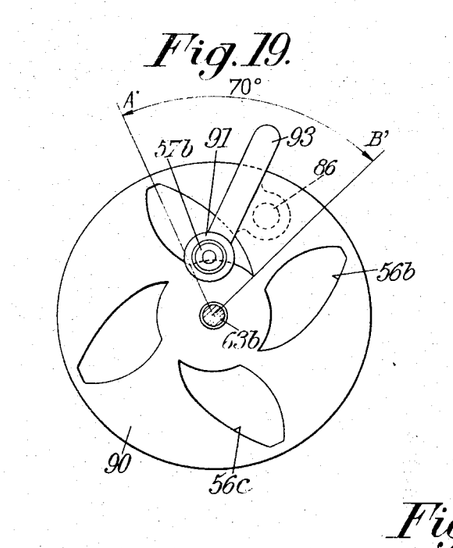
FIGS. 19 and 20 show separately for greater clarity, certain elements of the embodiment of FIG. 13.
Figure 20:
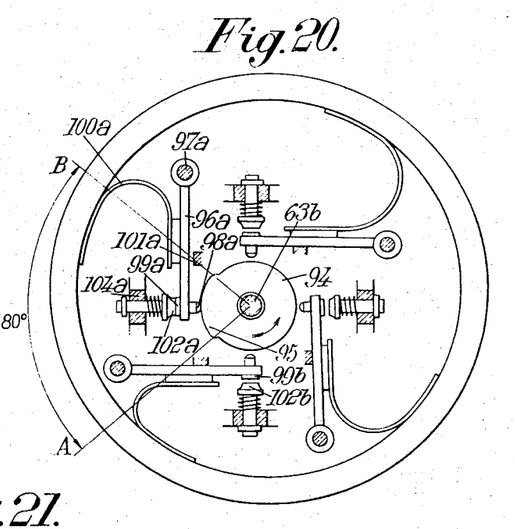
Figure 21:
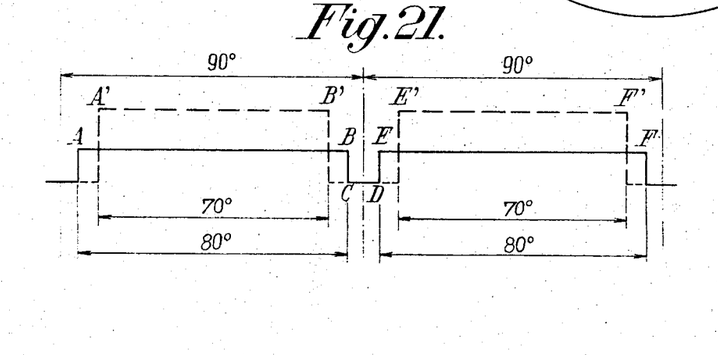
FIG. 21 shows diagrammatically the time cycle of the latter embodiment.

Such an arrangement is illustrated in FIGS. 19, 20 and 21.

The disk 90 and the cam 94 are fixed on the same spindle 63b and, consequently, rigidly fastened to one another.

The disk includes several windows such as 56b, 56c and it is positioned in FIG. 19 to correspond to the most unfavorable case, that is to say that at the angle during which the opening of the electromagnet is effected is maximum.

To this end, the lamp-cell assembly shown by 57b at the end of the arm 93 occupies the position which corresponds to the maximum opening of the throttle member 3b; it is assumed that, at this moment, the portion of large radius 95 of the cam 94 rests against the follower 98a to ensure electrical contact between the elements 99a and 102a.

If it is arranged that the longest portion of the window corresponds to about 70°, it is seen that the pulse given by the photoelectric cell is represented by the length A'—B' in the diagram (FIG. 21).

It is arranged that the cam 94 maintains the contact over a slightly larger angle, namely 80°, represented by the portion A—B of the diagram.

As the disk continues to turn, and given the equally separated positions of the four followers, such as 98a, it is seen that, at point B contact ceases and from C to D all contact is cut off. On the other hand, contact is reestablished at E up to F over 80° of rotation, but this contact will be effected on the screw 99b if the cam turns in the direction of the arrow of FIG. 20.

On the other hand, the window 56b will only allow the beam of light of the cell to pass from point E', that is to say after the contact 99b no longer touches the contact 102b. The pulse will last up to F' which is positioned before F, which marks the interruption of the contacts 99b and 102b before passing to the next follower, etc.

Consequently, when the current is established for supplying the injectors, either at A' or at E' or is cut off, either at B' or at F', the pairs of platinum screws are always in contact since these contacts are established at A or at E, and no longer at B or at F.

It follows that at the moment of interruption or of establishment of these contacts (B—C) or (E—D), no current passes.

The operation being repeated every 90°, the diagram only covers two phases of the operation which, obviously, is repeated in continuous manner. The assembly (form and angular extent of the lobe 95, relative angular position of this lobe and the windows 56b, width of these windows, path of the bosses 91, 92) is such that the separation of the contacts such as 99a and 102a and the putting into contact of the following contacts such as 99b and 102b takes place while the disk 90 blocks off the luminous beam coming from the lamp 59b, the contact of these latter contacts being maintained, not only during the following period when one of the windows 56b allows this beam to pass, but also slightly beyond.

The operation of the feed device shown in FIGS. 13 and 14 is as follows.

Progressively as the air flow rate in the conduit 1 increases, the throttle member 3b opens (thus passing from the position shown in dot-dash lines to the position shown in dashed lines in FIG. 14), and drives the support 93 (from the position shown in dot-dash lines to the position shown in solid lines in this FIG.), in the sense which moves the bosses 91 and 92 towards the spindle 63b. Each of the positions of these bosses corresponds to a different radius of the disk 90. As the shape of each window 56b has been determined such that the fraction of a revolution during which it lets the luminous ray pass from the lamp 59b to the cell 58b (creation of a current in the conductor 107) increases progressively as these latter elements move towards the spindle 63b, it is ensured that the flow rate of fuel delivered by each injector varies in the same sense as the flowrate of air in the conduit 1.

In the case of a four-stroke, four-cylinder engine, fed respectively by four injectors 18, it will be understood that if the disk 90 rotates, for example, at half the speed of the engine and has four windows 56b, these four windows pass in front of the cell 58b for two complete revolutions of the engine and actuate successively, due to the four contacts 99, 102, all the injectors. In the case of a spark ignition engine, these injectors can be actuated in the same order as the order of ignition and the moment of their opening can be synchronized with the suction stroke of the respective cylinders.

As the interruption and the establishment of the current of energization of the electromagnets take place during a period when the current does not pass, there is no fear of the formation of arcs, and consequently, of wearing and dirtying of the contacts.

The advantage of the device represented in FIGS. 13 and 14, with respect to those described with reference to the preceding FIGS., resides principally in a decrease of the cost price, first because four photoelectric cells are replaced by a single one, and above all, because, since the cam 94 acts on the various contactors, only a single relay 66 and a single current limiter 67 need be used for all the injectors 18.

In the foregoing, it has been supposed that the means for emitting a flux of energy were constituted by a luminous source 57b and the receiver of flux by a photoelectric cell 58b.

According to a variant, these means are constituted by magnetized plates, carried by a rotary member of nonmagnetic material, and the receiver by a magnetoresistance.

It will now be explained, with reference to FIGS. 15 and 16, how the embodiment of FIGS. 13 and 14 can be modified according to this variant.

Figure 15:
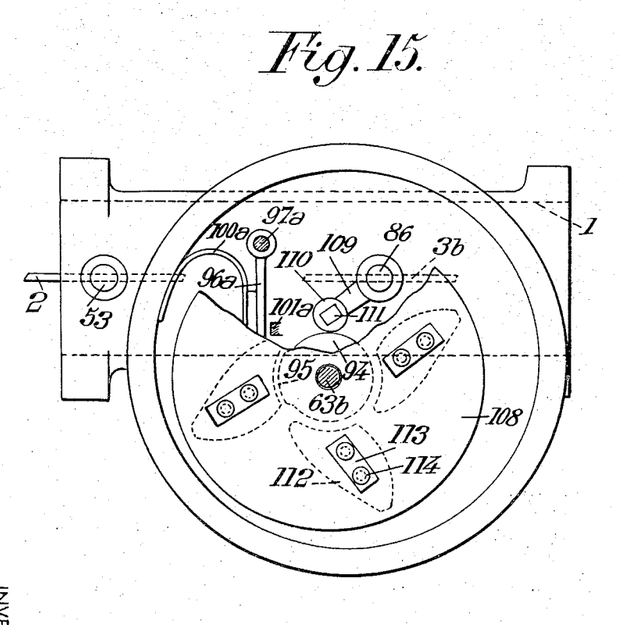
FIGS. 15 and 16 show, similarly to FIGS. 14 and 13, a fuel feed device established according to a fourth embodiment of the invention.
Figure 16:
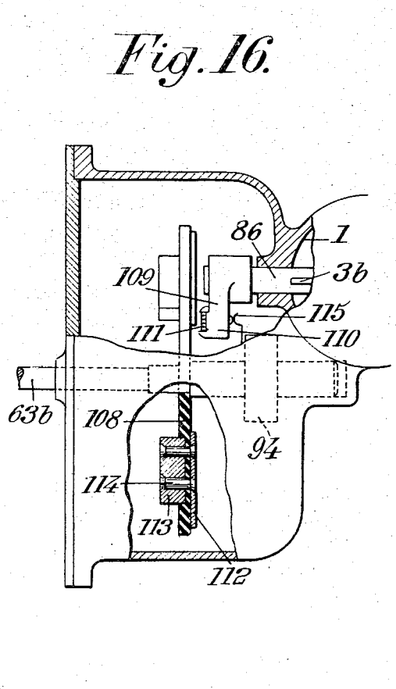

In particular, the auxiliary throttle member 3b responsive to the air flowrate in the conduit 1 and a rotary member 108 in the form of a disk fixed on the spindle 63b are found again in FIGS. 15 and 16. However, the spindle 86 of the member 3b carries an arm 109 of nonmagnetic material, at the end of which is formed a boss 110 receiving a magnetoresistance 111. The emitters of magnetic flux are constituted by plates 112 of ferromagnetic material, fixed on the disk 108 of nonmagnetic material and magnetized by magnets 113 to which these plates are connected by rivets 114. The form, the number and the disposition of the plates 112 are determined like those of the windows 56b of the previous embodiment. The disk 108 and the arm 109 can be constituted of plastic material. The magnetoresistance 111 is connected to a relay analogous to the relay 66 of FIGS. 4 and 13 by the intermediary of a flexible wire 115, permitting the displacement of the arm 109, and of a distributor system including a cam 94 identical to the system of FIGS. 13 and 14.

The operation of the device of FIGS. 15 and 16 is very analogous to the operation of the previous embodiment, that is to say that the arm 109 carrying the magnetoresistance 111 rotates with the spindle 86, and according as this magnetoresistance is nearer to or farther from the spindle 63b of the disk 108, it receives in the course of the rotation of the disk the magnetic flux emitted by the plates 112 during a greater or smaller fraction of each revolution of the disk.

As long as a plate 112 passes in front of the magnetoresistance 111, current passes in the corresponding electromagnet 19 since it has been seen that the contactors including the arms 96 established this current. As soon as the plate 112 considered has passed the magnetoresistance 111, this magnetoresistance is located opposite the part of the disk 108 which does not allow any emission of magnetic flux and the current ceases to be emitted towards an electromagnet.

It is seen that, for a high flow rate of air (butterfly valve 3b wide open as shown in FIGS. 15 and 16), the magnetoresistance 111 will be influenced by each magnetized plate 112 for nearly a quarter of a complete revolution of the disk 108, namely, for example, for an angle of 7°, whereas in the neighborhood of idling, magnetoresistance will be located nearly at the periphery of the disk 108 and will only be influenced for an angle of rotation which can be much smaller.

The system operates exactly as has been described with reference to FIGS. 13 and 14, for photoelectric cells.

It should be noted that, as in the previous embodiments, the disk 90 or 108 need not be driven by the spindle 63b at a speed proportional to the speed of the engine. This spindle can turn at any speed whatsoever, but in this case, it is no longer possible to cycle the flow rates of the injectors with the suction strokes. Nevertheless, the flow rates of fuel will remain in any case substantially proportional to the flow rates of air, so that the mixture introduced into the engine preserves a constant richness.

There has been described above, with reference to FIGS. 4, 8 and 13, an amplifier relay 66 inserted between the receiver (photoelectric cell, in particular) and the electromagnet 19. Advantageously this relay is constituted by a semiconductor amplifier comprising preferably, in cascade, a transistorized preamplifier stage 116a (FIGS. 17 and 18) according to the Darlington circuit and a final stage 116b composed of a power transistor whose collector circuit contains, mounted in series, the winding of the electromagnet and a diode intended to let the current pass, in the direction which causes the opening of the valve 18 and which protects the power transistor from the overvoltage due to the cutting of this current.

In the case in which a current limiter 67 is combined with the relay 66 (FIG. 18), this current limiter is advantageously constituted by a resistive circuit mounted in parallel with the feed of the emitter/base circuit of the power transistor; the closing of this resistive circuit is caused by a semiconductor element, for example a unijunction transistor, which becomes conductive only after energization of the electromagnet; the very short interval separating the instant of energization of the electromagnet from the instant of conduction of the unijunction transistor is a function of the time constant of an RC circuit disposed advantageously at the output of the preamplifier (Darlington circuit) in such a manner that the control voltage of the unijunction transistor can be taken from the terminals of the capacitor; a diode placed in series in the RC circuit lets the current pass in the direction which permits the control electrode of the unijunction transistor to be biased appropriately to cause the conduction of this unijunction transistor, and this diode opposes the discharge of the capacitor by the base circuit of the power transistor.

Figure 17:
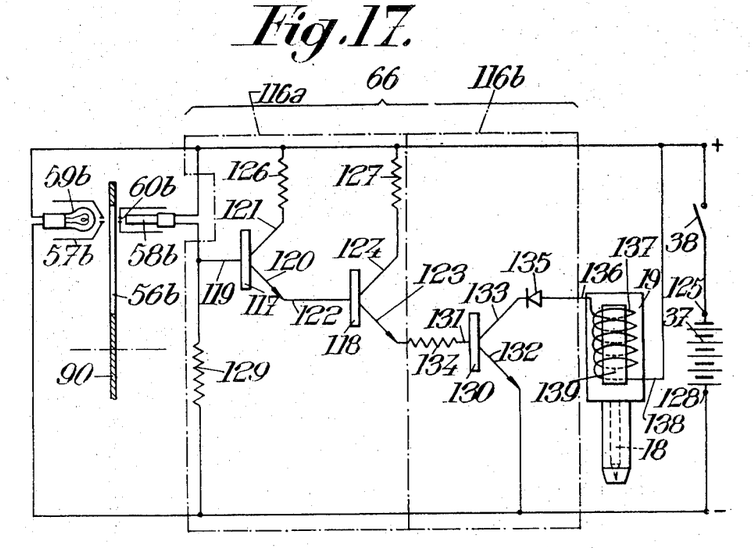
FIG. 17 shows the electric wiring diagram of the embodiment of FIGS. 13 and 14.

In the embodiment represented in FIG. 17, the preamplifier stage 116a is formed by two transistors 117 and 118, of the n-p-n-type, disposed according to a Darlington circuit. The transistor 117 has a base 119, an emitter 120, and a collector 121; the transistor 118 has a base 122, an emitter 123, and a collector 124. The emitter 120 of the transistor 117 is directly connected to the base 122 of the transistor 118; the collectors 121 and 124 are connected, respectively, by the intermediary of resistances 126 and 127, to the positive pole 125 of the battery 37. The base 119 of the transistor 117 is connected, on the one hand, by the intermediary of the photoelectric cell 58b, to the positive pole 125, and on the other hand, through a resistance 129, to the negative pole 128 of the battery 37.

The final power stage 116b comprises essentially an n-p-n power transistor 130, which has a base 131, an emitter 132, and a collector 133. The connection between the preamplifier stage 116a and the final stage 116b is ensured by a resistance 134 joining the emitter 123 of the transistor 118 to the base 131. The emitter 132 of the transistor 130 is directly connected to the negative pole 128. The collector 133 is connected, through a diode 135, to a terminal 136 of a winding 137. This diode 135 is conductive from 136 towards 133. The winding 137 is connected by its other terminal 138 to the positive pole 125. This winding 137 (analogous to the winding designated by 36 in FIG. 1) is the winding of the electromagnet 19 which controls the opening or the closing of the valve 18 by displacement of a core 139 subjected to the electromagnetic actions of the winding 137 and to a return force generated, for example, by a spring (shown at 42 in FIG. 1). Besides the element 58b, FIG. 17 shows the elements 38, 56b, 57b, 59b, 60b and 90 of the FIGS. 13 and 14, and these latter two FIGS. can also be referred to for a better understanding of the following explanation.

The operation of the device of FIG. 17 is as follows.

When the photoelectric cell 58b is not illuminated by the luminous source 57b, masked by the disk 90, its resistance is considerable with respect to the resistance of 129; there is a very great voltage drop in the resistance of 58b and the base 119 of the transistor 117 is negative with respect to the emitter 120 and to the collector 121. This transistor 117 is in the nonconductive state, as are the transistors 118 and 130. Thus no current passes in the collector 133 of the transistor 130, nor in the winding 137 of the electromagnet 19 which is thus not energized.

When the window (or one of the windows) 56b, provided in the disk 90, uncovers the luminous source 57b, the cell 58b is illuminated; the resistance of this cell decreases considerably, which permits the potential of the base 119 of the transistor 117 to increase and to become positive with respect to the potential of the emitter 120 and of the collector 121; the transistor 117 then becomes conductive as well as the transistors 118 and 130. The current can then circulate in the winding 137, which causes the displacement of the core 139 and the opening of the valve 18. As soon as the cell is no longer illuminated, the transistors 117, 118 and 130 become nonconductive. The current no longer circulates in the winding 137 and the electromagnet is no longer energized. The return means, such as the spring 42 (FIG. 4), causes the return of the core 139 to the initial position. The diode 135 then has the important effect of protecting the power transistor 130 from the overvoltage of self-induction generated at the terminals of the winding 137 at the interruption of the current.

For the reasons explained above, it is advantageous to provide a delayed current limiter 67 reducing, for example by half, the intensity of the current circulating in the winding 137, a very short instant after the displacement of the core 139.

Advantageously such a limiter 67 is constituted, and combined with the relay 66 of FIG. 17, in the following manner.

Figure 18:
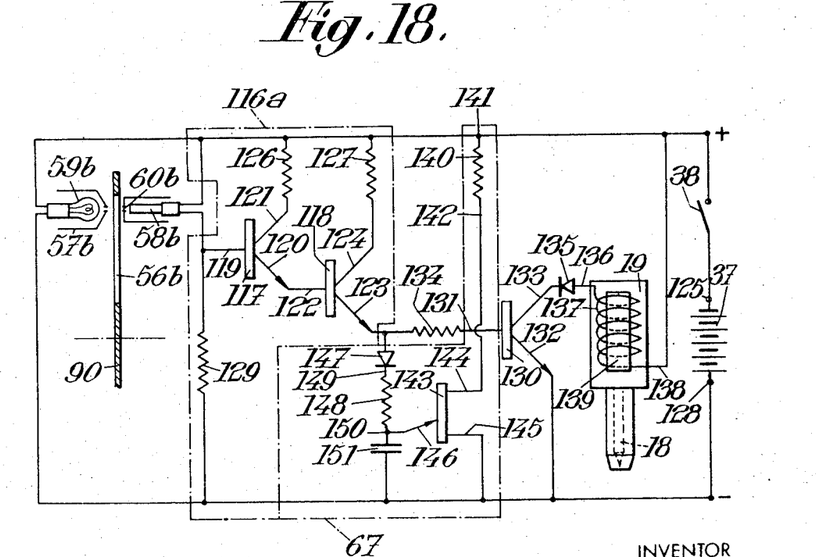
FIG. 18 shows an electric wiring diagram established according to a variant of FIG. 17.

As represented in FIG. 18, the device comprises a resistance 140 with terminals 141 and 142, a unijunction transistor 143 of the N type, or any other analogous component, with electrodes 144, 145 and emitter 146, a diode 147, a resistance 148 with terminals 149 and 150 and a capacitor 151.

The terminal 142 of the resistance 140 is connected to the electrode 144. The terminal 141 is connected to the positive pole 125 of the battery 37 and the electrode 145 to the negative pole 128. Moreover, the emitter 123 of the transistor 118 is connected to the negative terminal 128 by the intermediary of the diode 147, of the resistance 148 and of the capacitor 151, disposed in series in that order (pass sense for the diode 147). The emitter 146 is connected to the terminal 150 of the resistance 148 and this terminal 150 is itself connected to one terminal of the capacitor 151.

The operation of the limiter 67 is the following. As soon as the cell 58b is illuminated, the relay 66 operates as described previously and the core 139 is displaced. Initially, the unijunction transistor 143 is in the nonconductive state; this is obtained by an appropriate biasing of the emitter 146; then, as soon as current circulates in the emitter 123 and the resistance 134, a fraction of this current is tapped into 147,149,148,150,151,128, which charges the capacitor 151 and increases the voltage of the emitter 146. For a critical voltage reached by the emitter 146, at the end of a time depending in particular on the values of the resistance 148 and of the capacitor 151 and which can be of the order one-thousandths of a second, the unijunction transistor 143 becomes conductive and a part of the emitter current of the transistor 118, which passed through the base-emitter junction 131,132 of the transistor 130, is tapped into the circuit 147,149,148,150,146,145. By giving, for example, the resistance 148 a value in the neighborhood of the value of the resistance 134, the intensity of the current circulating in the base-emitter junction of the transistor 130 is thus divided by two. The current from the emitter 133, which circulates in the winding 137 of the electromagnet, passes from 1.5 A to 0.8 A approximatively, which is sufficient to maintain the valve 18 open. In any case, it is very easy to choose the resistances 134 and 148 as a function of the current decrease that it is wished to cause.

The devices described with reference to FIGS. 17 and 18 have numerous advantages, and in particular the following.

The use of a high-gain amplifierlike relay 66 permits the illumination of the photoelectric cell 58b to be very feeble, while still being sufficient to give a signal which, amplified, controls the electromagnet 19. In this manner, the lamps 59b can be used at subvoltage in order to prolong their lifespan, taking into account the fatigue imposed on the filaments by the vibrations of the engine. The relay 66 thus constituted has a very low inertia.

Moreover, the current limiter 67, in the preferred embodiment, has, in the first place, the advantages proper to any current limiter, namely:

a decrease of the heating of the winding 137;

a decrease of the time of response of the valve 18 to the opening by an increase of the initial current with respect to the maintenance current; and a decrease of the time of response to the closing of the valve 18 for the subsequent reduction of current, by decreasing the magnetic induction in the circuit, accelerates the speed of disappearance of the magnetism at the moment of the cutting of the current, which accelerates the closing of this valve 18.

In the second place, the limiter 67 has the advantages of electronic circuits whose parameters can be easily adjusted or modified to better adapt their performances to new needs.

The invention should not be limited to the preferred embodiments described by way of example, since many variants and modifications are possible without departing from the spirit or scope of the invention.

I Claim:

1. Fuel feed device, for an internal combustion engine, comprising:

an inlet conduit whose cross section is regulated by a principal throttle member adapted to be actuated by the operator;

a source of fuel under pressure having a delivery circuit which opens, via an orifice, into the inlet conduit downstream of the principal throttle member and which is controlled by at least one valve actuated by an electromagnet having an energization coil;

a metering system comprising a rotary member driven in a movement of continuous rotation and adapted to send into said coil, via an energization circuit, an energization impulse during a fraction of each revolution of said rotary member, which fraction is regulated by said system; and wherein said metering system is controlled by an auxiliary throttle member which is disposed in said inlet conduit upstream of the principal throttle member and which is arranged to open automatically and progressively to a corresponding degree as the air flow rate in said conduit increases, in such manner that said fraction varies in the same sense as the degree of opening of the auxiliary throttle member.

2. Feed device according to claim 1, wherein said internal combustion engine comprises a drive shaft, and wherein said rotary member has the form of a cam fixed on a spindle driven by a transmission imposing on said spindle a speed of rotation which is a multiple of the speed of rotation of said drive shaft.

3. Feed device according to claim 2, wherein said cam cooperates with a lever which is mounted, at one end, on a pivot pin and which carries, at its other end, a follower maintained in contact with said cam by a spring, which lever also carries a contact which cooperates with a fixed contact, these two contacts being placed in series in the energization circuit of the coil of the electromagnet.

4. Feed device according to claim 3, wherein, in order to vary said fraction of a revolution of said cam during which said two contacts are maintained one in contact with the other, a kinematic connection is provided between the auxiliary throttle member and the assembly of said lever and said cam.

5. Feed device according to claim 4, wherein said kinematic connection is adapted to displace said pivot pin of said lever transversely with respect to the length of said lever.

6. Feed device according to claim 1, wherein the orifice through which a said delivery circuit opens into said inlet conduit is protected from the influence of the suction prevailing in this conduit, said orifice opening for this purpose into a chamber which communicates with said inlet conduit by a second orifice alined with the first orifice and which is connected to the atmosphere by a third orifice of cross section greater than the cross section of said second orifice.

7. Feed device according to claim 1, wherein the source of fuel under pressure comprises a regulator adapted to maintain the pressure of the fuel injected normally at a constant value but to vary said pressure momentarily during a variation of the pressure of the air between said two throttle members.

8. Feed device according to claim 7, wherein said pressure regulator comprises a valve member controlling a return line and coupled to two diaphragms one of which is subjected to the delivery pressure and tends to open said valve member progressively as this pressure increases and the other of which is subjected to the suction prevailing in said inlet conduit between said two throttle members, this latter diaphragm tending to close said valve member, against the action of a spring, when said suction increases in absolute value.

9. Feed device according to claim 1, wherein said rotary member comprises means adapted to emit, towards a nonrotary receiver, a flux of energy during a fraction of a revolution whose value varies as a function of the relative position of said rotary member and of said receiver,
wherein said receiver is responsive to the energy flux and has two states, namely a state corresponding to reception of flux and a state corresponding to nonreception of flux, and said receiver is arranged to control the energization circuit of the coil said electromagnet according to the state of said receiver, and wherein said auxiliary throttle member modifies the relative position of said rotary member and of said receiver as a function of the air flow rate in said conduit.

10. Feed device according to claim 9, wherein said rotary member comprises a hollow cylindrical member mounted for rotation on a spindle, and wherein said receiver and said cylindrical member are arranged so as to be displaced one with respect to the other, axially of said spindle, by said auxiliary throttle member.

11. Feed device according to claim 9, wherein said rotary member comprises a plane disk perpendicularly mounted for rotation on a disk-spindle, and wherein said receiver is arranged to be moved respectively towards and away from said disk-spindle by said auxiliary throttle member.

12. Feed device according to claim 9, wherein said flux emitter means comprise a luminous source cooperating with said rotary member, said rotary member being arranged as a screen provided with at least one window, and said receiver comprises at least one photoelectric cell adapted, according to its state of illumination, to control the energization circuit of the coil of said electromagnet, said window of said screen having such a shape that the fraction of a revolution of the screen during which the illumination of said cell is permitted varies as a function of the relative position imposed on said screen and on the assembly of the source and the cell by the auxiliary throttle member.

13. Feed device according to claim 12, wherein said screen comprises a hollow cylindrical member mounted for rotation on a spindle and driven with a movement of simple rotation which leaves it an invariable axial position, and wherein the luminous source and the cell are mounted on a common support which is driven with a movement of translation, with respect to said cylindrical member parallel to said spindle.

14. Feed device according to claim 13 in which said auxiliary throttle member is formed by a throttle member adapted to slide transversely with respect to said inlet conduit, wherein said common support is rigid with said throttle member.

15. Feed device according to claim 12, wherein, in order to constitute a system avoiding atmospheric pollution during periods of deceleration, the luminous source is fed with electric current in parallel by two contactors, the first of which is arranged to allow the current to pass when the speed of the engine is lower than a given limit slightly higher than the idling speed and the second of which is arranged to allow the current to pass when said principal throttle member is open beyond its idling position.

16. Feed device according to claim 15, wherein said screen has a spindle which is driven by the internal combustion engine, and said first contactor is controlled by a centrifugal regulator mounted on the end of said spindle of said screen.

17. Feed device according to claim 12, in which said screen is driven by the internal combustion engine, wherein, in order to constitute a system avoiding atmospheric pollution during periods of deceleration, the screen carries an opaque ring adapted to turn with respect to the screen under the effect of the centrifugal force due to the rotation of the screen and situated so as only to be located in the neighborhood of the luminous beam coming from the source towards the cell when the cell is in the common position corresponding to idling and to deceleration but to obstruct said beam only when said ring occupies, with respect to the screen, the position corresponding to speeds higher than the idling speed.

18. Feed device according to claim 9, wherein said flux emitter means comprise magnetized plates, carried by a rotary member of nonmagnetic material, and the receiver comprises a magnetoresistance adapted, according to its state, to control the energization circuit of said electromagnet, the magnetized plates having a form such that the fraction of a revolution of the rotary member during which the magnetoresistance is exposed to the magnetic field varies as a function of the relative position imposed on the rotary member and on the magnetoresistance by the auxiliary throttle member.

19. Feed device according to claim 1, for an internal combustion engine having a plurality of cylinders which are each fed by a valve actuated by an individual electromagnet, wherein a distributor synchronized with said rotary member is arranged to send successively the intermittent energization current into the various electromagnets, the assembly being such that the interruption of the circuit of one electromagnet and the establishment of the circuit of the following electromagnet takes place at a time outside said fractions of revolution.